United States Patent [19]

Powell

[11] 4,352,014
[45] Sep. 28, 1982

[54] SAMPLER AND CELL FOR RADON DETECTORS AND METHOD OF USING SAME

[76] Inventor: Brian Powell, 221-29th St. West, Saskatoon, Saskatchewan, Canada, S7L 0L8

[21] Appl. No.: 127,906

[22] Filed: Mar. 6, 1980

[30] Foreign Application Priority Data

Jun. 1, 1979 [GB] United Kingdom ............... 7919214

[51] Int. Cl.³ .............................................. G01V 5/00
[52] U.S. Cl. .................................... 250/253; 250/255; 250/364
[58] Field of Search ............. 250/253, 255, 337, 379, 250/380, 484, 364

[56] References Cited

U.S. PATENT DOCUMENTS 4,156,138 5/1979 Felice ................................. 250/253
4,177,378 12/1979 Stevens ............................... 250/253

*Primary Examiner*—Davis L. Willis

*Attorney, Agent, or Firm*—Stanley G. Ade

[57] ABSTRACT

A relatively small diameter, relatively deep hole is made in the ground and a sampler tube is inserted therein. An acetate sleeve is detachably inserted into a chamber on the upper end of the sampling tube and the sampler is left for at least sixteen hours and preferably longer in order to permit radon gas to migrate up the tube. Daughter products of radon deposit on the acetate film which is then placed in a scintillation cell attached to the counting chamber of a scintillation counter, which counts the alpha emissions of the daughter products thereby permitting the amount of radon gas to be calculated. This method reduces considerably any contamination of the scintillation counting chamber so that cleansing is not necessary thus permitting a much higher level of productivity. The system is also totally insensitive to thoron so that no correction for thoron signals is required. The same method can be used to collect airborne samples by hanging the acetate strip in a desired location for at least four hours and counting alpha emissions from said strip as above.

11 Claims, 6 Drawing Figures

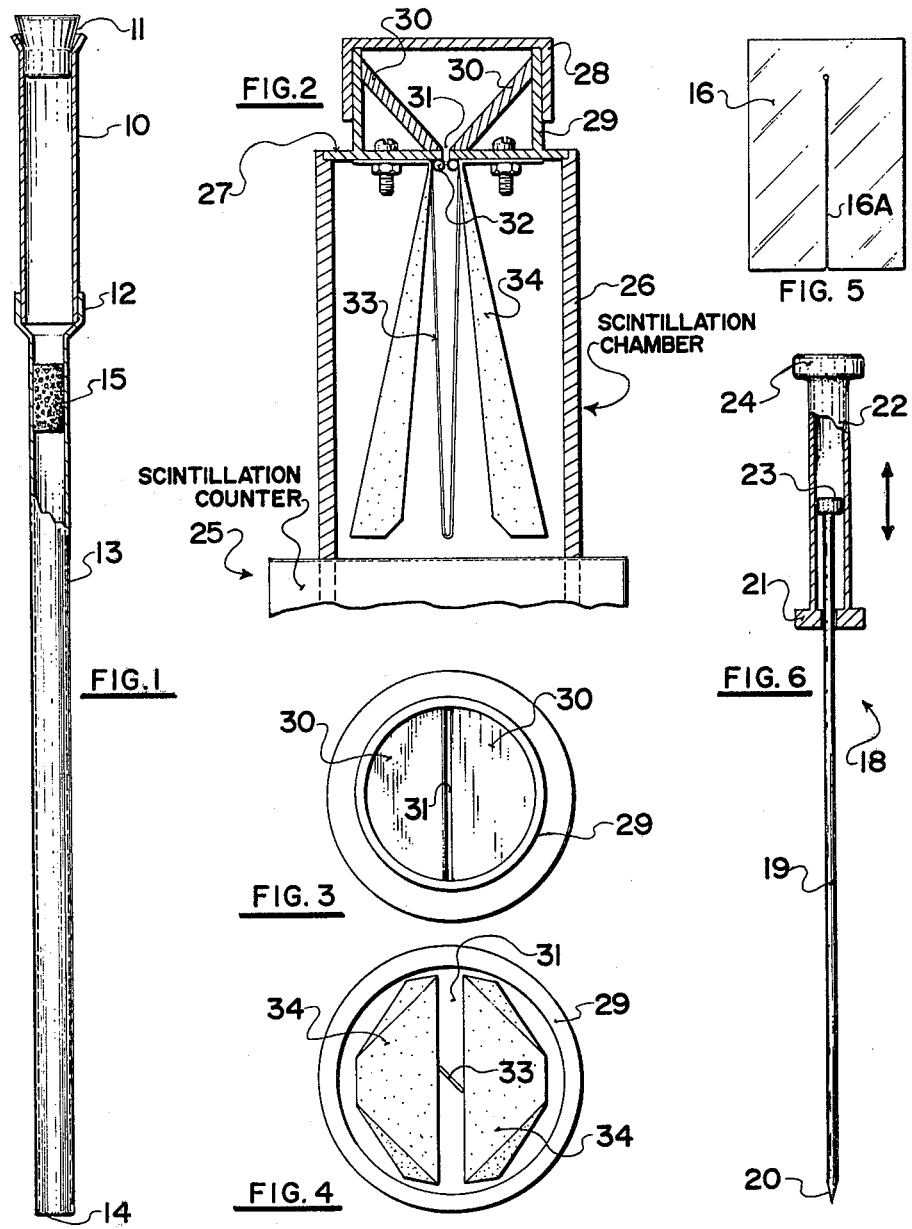

SAMPLER AND CELL FOR RADON DETECTORS AND METHOD OF USING SAME

BACKGROUND OF THE INVENTION

This invention relates to new and useful improvements in survey methods for radon and although designed basically for the surveys of radon in soil, nevertheless it is readily adapted for use for the survey of airborne radon as will hereinafter be described. It includes the sampling apparatus and the scintillation cell and the method of using same.

Conventionally, the abundance of radon in soil is determined by using standard radon sniffers, buried alpha deflectors and the like.

These suffer from several disadvantages given below:

Firstly, there is a serious contamination of the scintillation chamber after each sample which becomes increasingly severe over a series of samples, to the point where the contamination count may even exceed the count due to radon. This makes the radon sniffer an inherently very inaccurate instrument.

Secondly, very long waiting times are required (15 minutes is not uncommon) between samples for flushing radon from the chamber and to allow the instrument to decontaminate in order to minimize the above disadvantage. This severely diminishes the productivity of the instrument.

Thirdly, at least two successive counts of at least one minute each are required to adequately distinguish radon from thoron which is also abundant in some areas. The long residence time of radon in the scintillation chamber aggravates problem above.

Fourthly, the hand pump normally used, is a frequent source of error. It can fail to perform its function adequately without the knowledge of the operator.

The combined effect of these problems makes the sniffer a difficult and unreliable instrument, particularly for small amplitude anomalies.

SUMMARY OF THE INVENTION

The present invention overcomes these disadvantages because the presence of radon is determined indirectly by counting alpha emissions from daughter products of radon and the intent of the invention is to circumvent the problems listed above, by measuring alpha emissions from a solid phase rather than from a gas.

This is accomplished by depositing the radioactive daughter products of radon on strips of acetate or other synthetic plastic film or the like which are then introduced into a conventional scintillation chamber. Because the daughter products are firmly adsorbed on the film, they are not able to travel about and contaminate the scintillation chamber and it has been found that this approach effectively eliminates the problem of contamination thereby permitting a much higher level of productivity.

A scintillation cell is also provided to receive the film strips, said cell being attachable to the scintillation chamber of a conventional radon detector consisting of a scintillation counter.

In accordance with the invention there is provided a method of sampling radon gas consisting of the steps of placing an acetate sampling strip in the path of the radon gas and maintaining same in position for a predetermined time interval, inserting said sampling strip into a scintillation cell previously connected to a scintillation counter to read the alpha emissions from said sample strip.

In accordance with a further aspect of the invention there is provided a method of sampling radon gas consisting of the steps of forming a bore hole substantially vertically within the ground, inserting a sampling tube into the bore hole, inserting an acetate sampling strip in a collecting chamber on the upper end of said sampling tube and maintaining same in position for a time sufficient for radon gas to diffuse up the length of the sampling tube, to enter the chamber, to decay to produce radioactive daughter products in a solid phase, and for these daughter products to attach themselves to said acetate sampling strip and then inserting said sampling straip into a scintillation cell previously connected to a scintillation counter to read the alpha emissions from said daughter products.

An important aspect of the invention consists of apparatus for sampling radon gas which incorporates an elongated, open-ended, ground-engaging sampling tube which, by virtue of its length, (1) channels radon gas, by diffusion, to an upper collecting chamber from a depth sufficient to minimize atmospheric influences and (2) excludes short-lived thoron gas from said collecting chamber. Said chamber is secured to the upper end of said sampling tube and communicating with the interior thereof for removably receiving a curved acetate film sleeve around the inner surface of said chamber.

Another aspect of the invention is the use of a cell to receive the acetate film sleeve, said cell including an upper portion and a lower portion and a sealing disc therebetween, said upper portion including film strip guiding means, a feed slot in said sealing disc to receive said film strip, said guiding means guiding said film strip into said slot, a film strip holder below said sealing disc to receive said film strip and an enclosure partially enclosing said film strip holder, said enclosure being coated with activated zinc sulphide phosphor.

A yet further advantage of the invention is to provide a device of the character herewithin described which is simple in construction, economical in manufacture, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a schematic diagram of one embodiment of a sampler for collecting radon daughter products.

FIG. 2 shows a schematic partially sectioned side elevation of a scintillation cell constructed for use with the invention and attachable to a conventional RD200 radon detector.

FIG. 3 is a top plan view of FIG. 2.

FIG. 4 is an underside view of FIG. 2.

FIG. 5 is a front elevation of a removable acetate sleeve usable within the sampling chamber of FIG. 1.

FIG. 6 is a side elevation of a device which may be used to form a bore hole within the ground to receive the sampler of FIG. 1.

In the drawings like characters of reference indicate corresponding parts in the different figures.

DETAILED DESCRIPTION

Dealing first with the sampler, the body is preferably made entirely of metal tubing. It comprises an upper cylindrical collecting chamber 10 having a removable stopper 11 engageable within the upper end thereof. A coupling 12 joins the lower open end of the larger upper tube to the open upper end of a narrower lower tube 13 which extends downwardly and is provided with an open lower end 14. This tube is also preferably made of metal such as copper, aluminum or the like and although dimensions are shown, these are exemplary only and are not to be considered limiting.

A radon gas permeable foam plug 15 of synthetic plastic or other suitable material, is engaged within adjacent the upper end of the lower tube 13 to prevent dirt and water from entering the collecting chamber during operation but the plug does not significantly impede the movement of the radon.

A removable acetate sleeve shown by reference character 16, in FIG. 5, is rolled lengthwise and inserted into the upper larger tube 10 to form a liner. This sleeve is preferably rectangular and is slit centrally from the base to adjacent the upper edge as indicated by 16A, the purpose of which will hereinafter be described.

To take a sample, a rod or hammer component 18 of mild steel or the like approximately 1.6 cm in diameter and approximately 1 meter in length, is hammered into the soil as far as is practical and then removed thus forming a downwardly extending hole with a diameter slightly larger than the diameter of the lower narrower copper tube 13. Details of one type of hammer component are shown in FIG. 6. This hammer component collectively designated 18 includes an elongated length of steel rod 19 approximately four feet in length and having a pointed distal end 20 formed thereon.

It is slidable through a collar 21 secured to the lower end of a tube 22 and retained therein by means of an enlarged inner end 23 so that it is slidable relative to the tube.

A steel plate or hammer head 24 is secured to the other end of the tube and reciprocation of this tube with the hammer head portion 24 impacting upon the end 23, drives the rod into the ground.

However, other devices or methods can be used, as desired.

One of the advantages of the device is the fact that rapid planting of the sampler tubes can be made. Many other methods require a hole made by an auger or the like which is time consuming and with a steel rod, it is much easier to make a relatively narrow diametered hole to be used as a channel for the upward movement of the radon rather than making a large hole with an auger to bury the entire detector as is usual.

The sampler is then placed into the hole the full length of the narrower tube 13 and the soil is packed tightly around it with the heel of the foot of the operator.

Radon is able to diffuse up the length of the narrower tube 13, through the plastic foam plug 15 and enter the collecting chamber 10 whereupon it decays, producing radioactive daughter products which are in a solid phase and which therefore attach themselves readily to the acetate film lining the collecting chamber.

Sampling of the radon gas is by means of diffusion through the vertical tube 13 from a depth, in this example, of some 46 cm below the ground surface. This minimizes influences due to changes in weather which could be greater at shallower depths.

It can readily be calculated how much time is required for radon to reach equilibrium with its important alpha emitting daughter products, polonium 218 and polinium 214 (Applied Geophysics, Telford et al, 1976). It takes about 3.6 hours to reach equilibrium. It was observed that it takes about the same time for alpha activity on the exposed acetate films to reach a maximum. Approximately four hours should also be allowed for radon to diffuse up the sampling tube and to reach a maximum abundance in the collecting chamber.

If the highly variable rates of radon diffusion are considered, through the various types of soil which the sampler might encounter, it is apparent that it is desirable to employ the longest practical interment. For this reason it is desirable to plant the samplers one day and allow them to remain overnight to be read the following morning.

The transit time to the collecting chamber for thoron 220 is expected to be long compared to its half life (55 seconds). On the other hand, the half life of radon$^{222}$ is long (3.8 days) compared to its transit time. Therefore, it can reasonably be expected that any thoron signal will be heavily attenuated with respect to the radon$^{222}$ signal and this greatly simplifies the data processing since no correction for thoron is required.

The present system is insensitive to thoron gas, a common source of error in other radon detection methods. The minimum transit time for radon (either radon$^{222}$ or thoron$^{220}$) from the mouth of the sampler to the collecting chamber through the, for example, 46 cm path, is approximately 30 minutes at room temperatures or 33 thoron half-lives or 0.006 radon$^{222}$ half-lives. Thoron attenuation is therefore about $10^{-10}$ with respect to radon. (This was measured by connecting a vertical tube, 46 cm long, directly to a scintillation chamber, connecting a radon source to the lower, opposite end and measuring the time until alpha activity increased above the noise level of the instrument.)

It should be pointed out that the design of the sampler shown in FIG. 1 is not optimum for an alpha count level. For example, a larger diameter collecting chamber would increase the concentration of daughter products in the acetate film but the present example can be manufactured from readily available parts at relatively low costs.

The sampling tube could readily be used with other types of radon detectors such as thermoluminescent devices and Track Etch (trade mark) which might be placed directly in the tubes.

For surveys of airborne radon, the acetate sampling film strips 16 can be mounted on vegetation such as trees and bushes or some artificial structure above the ground surface, by means of a clip or other device (not illustrated) and of course care must be taken to ensure that the film surfaces are not covered by leaves, branches or the like. In this type of survey, namely an airborne survey, the use of the sampling tube is eliminated.

During periods of atmospheric inversion (primarily at night), radon emanating from the earth's surface (airborne radon) remains close to the ground and is carried along by any air movements that might be present. Anomalously high radon emanation will produce clouds of anomalous radon which will extend downwind from the ground source. A radon cloud will deposit anomalous amounts of radon daughter products on film mounted within that cloud so that the track of such a cloud can readily be detected by reading the alpha emissions in the manner hereinafter to be described.

A regular grid of sample films mounted on vegetation within an area of interest may be read on days when atmospheric conditions are favorable for a period well in excess of four hours. These conditions are firstly temperature inversion, secondly constant wind direction and thirdly relatively low wind speed so that it is therefore desirable to monitor these conditions constantly during the survey.

The benefits of such a survey include the fact that anomalous radon emanations may be detected which could be missed in a standard radon-in-soil gas survey. Secondly, sources of airborne radon which are completely outside the surveyed area, may be detected if the wind direction is favourable and finally, since no hole is made in the ground, nor is anything planted in the ground, the labour required to perform an airborne radon survey is substantially less than radon-in-soil gas surveys.

Regardless of the type of survey used, a scintillation cell is required in order to adapt the RD200 radon detector or the like to read the acetate strips and this is shown schematically in FIG. 2.

No changes are necessary to the radon detector itself inasmuch as the assembly fits directly into the scintillation chamber and is held in place by the retaining ring of the detector and this detector is indicated schematically by reference character 25 with the scintillation chamber indicated at 26.

The scintillation cell collectively designated 17, consists of the substantially cylindrical cell 17 with a disc-type cover 27 for engaging the counting chamber 26 and including a light tight cap 28 engaging the upper end portion 29 and which can be removed for changing sampling film strip 16.

Guides 30 are provided within the cell 17 for inserting the acetate film through a slot 31 in the cover for the counting or scintillation chamber and slope inwardly and downwardly to the edges of the slot 31.

Reference character 32 shows schematically conventional black fibrous lining along the slot 31 for light shielding and reference character 33 shows an open wire form or frame to hold the acetate film 16 inserted through slot 31. This wire form or frame depends downwardly from the cover 27 into the lower portion 34 of the cell.

Metal sheeting, approximately 0.2 mm thick is shown by reference character 34 and is coated inside with activated zinc sulfide. This partially surrounds the wire frame and acts as a partial enclosure.

A small black opaque hood (not illustrated) is preferably attached permanently to the chamber cover so that all film strip changes must be made through the hood. This ensures that no great quantity of ambient light can enter the chamber and excite the phosphor or photo multiplier tube and this does not significantly inhibit the film changing process.

To read a sampler, the following actions are performed:

(1) The acetate film is removed from the sampler and folded back upon itself so that the daughter products remain exposed. The film is slit nearly its full length 16A, to facilitate folding.

(2) The hand holding the film is inserted into the hood, the cap 28 is removed and the acetate film is immediately inserted through the slot 31 (see FIG. 2) to be supported in wire frame 33.

(3) The cap 28 is replaced before the hand is removed from the hood.

(4) A two minute count is normally taken.

In practice, it is desirable to endeavor to read the film strips immediately after removal from the sampler since their radioactivity begins to decline from that moment.

It was also found that radioactivity is not lost from the films as a result of handling as even vigorous rubbing did not measurably affect the count rate. However, care must be taken to avoid moisture on the films, which might impede the emission of alpha particles.

Summarizing, some of the advantages of the system are as follows:

Cell contamination is, for all practical purposes, eliminated. Thus only one cell is required for a survey and no waiting is required for decontamination.

The combined noise level of the cell and the electronics in continuous operation is very low. Between zero and one count over two minutes is normal with an RD200 radon detector.

Sample changes are extremely rapid. These are typically less than 15 seconds between the end of the last count and the start of the next count.

The sampling tube is light and easily transported in large quantities. An operator can readily carry approximately one hundred such tubes made of aluminum, for example, in a knapsack in addition to the device used to form a borehole within the ground to receive the sampling tube.

Productivity is excellent. In an eight-hour day it is possible to make 150 to 200 sample measurements per instrument employing a two-minute count period. These are high quality readings with no thoron contribution. Even greater productivities may be achieved with a one-minute count.

The traditional hand pump and tubing are eliminated. Pumping is achieved by natural diffusion over a time period of at least sixteen hours. The system therefore is very reliable and effective in all types of soil conditions including water saturated clay.

Systematic surveys of atmospheric radon may be made because the system is sensitive enough to accomplish this.

The system may also be useful for environmental monitoring where many locations must be checked frequently.

The equipment is easily adapted to any conventional radon detector with a cell configuration similar to the RD200 radon detector.

In conclusion, the device and system is usable for uranium exploration inasmuch as it is highly effective for detecting mineralization in place, mineralized boulders and tills and especially useful for surveys where cell contamination is normally a major problem.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A method of sampling radon gas consisting of the steps of placing an acetate sampling strip in the path of the radon gas and maintaining same in position for a predetermined time interval, inserting said sampling strip into a scintillation cell and operatively connecting said cell to a scintillation counter to read the alpha emissions from said sample strip.

2. A method of sampling radon gas consisting of the steps of forming a bore hole substantially vertically within the ground, inserting a sampling tube into the bore hole, inserting an acetate sampling strip in a sampling chamber on the upper end of said sampling tube and maintaining same in position for a time sufficient for radon gas to diffuse up the length of the sampling tube, to enter the chamber, to decay to produce radioactive daughter products in a solid phase, and for these daughter products to attach themselves to said acetate sampling strip and then inserting said sampling strip into a scintillation cell previously connected to a scintillation counter to read the alpha emissions from said daughter products.

3. Apparatus for sampling radon gas comprising in combination a sampling assembly, said sampling assembly including an elongated open ended ground engaging sampling tube and an upper collecting chamber secured to the upper end of said sampling tube and communicating with the interior thereof for removably receiving a curved acetate film sleeve around the inner surface of said collecting chamber.

4. The invention according to claim 3 which includes a radon permeable plug situated at the upper end of said sample tube for preventing the ingress of dirt, water and the like to said collecting chamber and detachable closure means on the upper end of said collecting chamber.

5. The invention according to claim 3 which includes a scintillation cell to receive the acetate film sleeve from said collecting chamber.

6. The invention according to claim 4 which includes a scintillation cell to receive the acetate film sleeve from said collecting chamber.

7. The invention according to claim 5 in which said cell includes an upper portion and a lower portion and a sealing disc therebetween, said upper portion including film strip guiding means, a feed slot in said sealing disc to receive said film strip, said guiding means guiding said film strip into said slot, a film strip holder below said sealing disc to receive said film strip and an enclosure partially enclosing said film strip holder, said enclosure being coated with activated zinc sulphide phosphor.

8. The invention according to claim 6 in which said cell includes an upper portion and a lower portion and a sealing disc therebetween, said upper portion including film strip guiding means, a feed slot in said sealing disc to receive said film strip, said guiding means guiding said film strip into said slot, a film strip holder below said sealing disc to receive said film strip and an enclosure partially enclosing said film strip holder, said enclosure being coated with activated zinc sulphide phosphor.

9. A scintillation cell for receiving a film strip for the detection of alpha emissions therefrom, for use in a scintillation counter type radon detector, said cell including an upper portion and a lower portion and a sealing disc therebetween, said upper portion including film strip guiding means, a feed slot in said sealing disc to receive said film strip, said guiding means guiding said film strip into said slot, a film strip holder below said sealing disc to receive said film strip and an enclosure partially enclosing said film strip holder, said enclosure being coated with activated zinc sulphide phosphor.

10. The invention according to claims 3, 4 or 5 in which said sampling tube by virtue of its length, (1) channels radon gas, by diffusion, to said upper collecting chamber from a depth sufficient to minimize atmospheric influences and (2) excludes short-lived thoron gas from said collecting chamber.

11. The invention according to claims 6, 7 or 8 in which said sampling tube by virtue of its length, (1) channels radon gas, by diffusion, to said upper collecting chamber from a depth sufficient to minimize atmospheric influences and (2) excludes short-lived thoron gas from said collecting chamber.

* * * * *